United States Patent
Song et al.

(10) Patent No.: US 11,176,406 B2
(45) Date of Patent: *Nov. 16, 2021

(54) EDGE-BASED RECOGNITION, SYSTEMS AND METHODS

(71) Applicant: Nant Holdings IP, LLC, Culver City, CA (US)

(72) Inventors: Bing Song, La Canada, CA (US); Matheen Siddiqui, Santa Clara, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 465 days.

This patent is subject to a terminal disclaimer.

(21) Appl. No.: 16/112,512

(22) Filed: Aug. 24, 2018

(65) Prior Publication Data

US 2018/0365515 A1 Dec. 20, 2018

Related U.S. Application Data

(63) Continuation of application No. 15/488,371, filed on Apr. 14, 2017, now Pat. No. 10,083,366, which is a
(Continued)

(51) Int. Cl.
*G06F 16/22* (2019.01)
*G06K 9/46* (2006.01)
(Continued)

(52) U.S. Cl.
CPC ....... *G06K 9/4638* (2013.01); *G06F 16/2246* (2019.01); *G06F 16/51* (2019.01);
(Continued)

(58) Field of Classification Search
CPC .............. G06K 9/4638; G06K 9/3241; G06K 9/4633; G06K 9/4671; G06K 9/48;
(Continued)

(56) References Cited

U.S. PATENT DOCUMENTS 5,487,172 A * 1/1996 Hyatt .................. B60R 16/0373
712/32
5,640,468 A 6/1997 Hsu
(Continued)

FOREIGN PATENT DOCUMENTS

EP 2054855 B1 7/2012
WO 0184497 A2 11/2001
(Continued)

OTHER PUBLICATIONS

Medioni et al., "A Computational Framework for Segmentation and Grouping, 2000," Elsevier Science B.V., 280 pages.
(Continued)

*Primary Examiner* — Hanh B Thai
(74) *Attorney, Agent, or Firm* — Mauriel Kapouytian Woods LLP; Elaine K. Lee; Andrew Noble

(57) ABSTRACT

Edge-based recognition systems and methods are presented. Edges of the object are identified from the image data based on co-circularity of edgels, and edge-based descriptors are constructed based on the identified edges. The edge-based descriptors along with additional perception metrics are used to obtain a list of candidate objects matched with the edge-based descriptors. Through various filtering processes and verification processes, false positive candidate objects are further removed from the list to determine the final candidate object.

27 Claims, 5 Drawing Sheets

Related U.S. Application Data continuation of application No. 14/623,341, filed on Feb. 16, 2015, now Pat. No. 9,665,606.

(60) Provisional application No. 61/940,325, filed on Feb. 14, 2014.

(51) Int. Cl.
| | | |
|---|---|---|
| *G06F 16/51* | (2019.01) | |
| *G06F 16/583* | (2019.01) | |
| *G06K 9/48* | (2006.01) | |
| *G06T 7/13* | (2017.01) | |
| *G06K 9/32* | (2006.01) | |
| *H04L 29/08* | (2006.01) | |

(52) U.S. Cl.
CPC ....... *G06F 16/5854* (2019.01); *G06K 9/3241* (2013.01); *G06K 9/4633* (2013.01); *G06K 9/4671* (2013.01); *G06K 9/48* (2013.01); *G06T 7/13* (2017.01); *H04L 67/10* (2013.01); *G06K 2209/051* (2013.01)

(58) Field of Classification Search
CPC ............... G06K 2209/051; G06T 7/13; G06F 16/5854; G06F 16/2246; G06F 16/51; H04L 67/10
USPC ......................................................... 707/804
See application file for complete search history.

(56) References Cited

U.S. PATENT DOCUMENTS

| | | | |
|---|---|---|---|
| 5,768,420 A | 6/1998 | Brown et al. | |
| 6,118,488 A | 9/2000 | Huang | |
| 6,324,673 B1 | 11/2001 | Luo et al. | |
| 6,404,920 B1 | 6/2002 | Hsu | |
| 6,711,293 B1 | 3/2004 | Lowe | |
| 6,748,110 B1 | 6/2004 | Wallack | |
| 7,016,532 B2 | 3/2006 | Boncyk et al. | |
| 7,263,220 B2 | 8/2007 | Crandall et al. | |
| 7,327,888 B2 | 2/2008 | Simon et al. | |
| 7,409,092 B2 | 8/2008 | Srinivasa | |
| 7,519,414 B2 | 4/2009 | Mitschke et al. | |
| 7,650,030 B2 | 1/2010 | Shan et al. | |
| 7,697,792 B2 | 4/2010 | Keating et al. | |
| 7,738,705 B2 | 6/2010 | Casadei | |
| 7,796,839 B2 | 9/2010 | Dewaele | |
| 7,804,980 B2 * | 9/2010 | Sasaki .................... | G06K 9/468 382/103 |
| 8,050,459 B2 | 11/2011 | Zhang et al. | |
| 8,204,277 B2 | 6/2012 | Zhang et al. | |
| 8,218,873 B2 | 7/2012 | Boncyk et al. | |
| 8,224,077 B2 | 7/2012 | Boncyk et al. | |
| 8,224,078 B2 | 7/2012 | Boncyk et al. | |
| 8,363,939 B1 | 1/2013 | Khosla et al. | |
| 8,396,327 B2 | 3/2013 | Spyridonos et al. | |
| 8,422,782 B1 | 4/2013 | Dhua et al. | |
| 8,442,304 B2 | 5/2013 | Marrion et al. | |
| 8,538,164 B2 | 9/2013 | Zitnick, III | |
| 8,589,410 B2 | 11/2013 | Sud et al. | |
| 8,634,654 B2 | 1/2014 | van Zwol et al. | |
| 8,755,625 B2 | 6/2014 | Singh et al. | |
| 8,755,837 B2 | 6/2014 | Rhoads et al. | |
| 8,827,710 B2 | 9/2014 | Zitnick, III et al. | |
| 9,152,888 B2 | 10/2015 | Kenyon et al. | |
| 9,177,381 B2 | 11/2015 | McKinnon | |
| 9,189,886 B2 | 11/2015 | Black et al. | |
| 9,456,187 B1 | 9/2016 | Liu et al. | |
| 9,495,607 B2 | 11/2016 | Tombari et al. | |
| 9,665,606 B2 | 5/2017 | Song et al. | |
| 9,740,963 B2 | 8/2017 | Sawhney et al. | |
| 10,083,366 B2 | 9/2018 | Song et al. | |
| 2007/0047809 A1 * | 3/2007 | Sasaki ................ | G06K 9/00791 382/170 |
| 2011/0103699 A1 | 5/2011 | Ke et al. | |
| 2011/0106782 A1 | 5/2011 | Ke et al. | |
| 2013/0170711 A1 | 7/2013 | Chigos et al. | |
| 2014/0270362 A1 | 9/2014 | Najafi Shoushtari et al. | |

FOREIGN PATENT DOCUMENTS

| | | |
|---|---|---|
| WO | 2011069021 A2 | 6/2011 |
| WO | 2013124837 A1 | 8/2013 |

OTHER PUBLICATIONS

Damen et al., "Real-Time Learning and Detection of 3D Textureless Objects: A Scalable Approach," British Machine Vision Conference, 2012, 12 pages.

Hotta, "Manifold matching for High-Dimensional Pattern Recognition," Pattern Recognition Techniques, Technology and Applications, 2008, 19 pages.

Silpa-Anan et al., "Optimized KD-trees for fast image descriptor matching," Conference on Computer Vision and Pattern Recognition (CVPR 2008), 8 pages.

Besl et al., "A Method for Registration of 3-D Shapes," IEEE Transactions on Pattern Analysis and Machine Intelligence, Feb. 1992, vol. 14, Issue 2, pp. 239-256.

Mordohai et al., "Tensor Voting: A Perceptual Organization Approach to Computer Vision and Machine Learning," Synthesis Lectures on Image, Video, and Multimedia Processing, 2006, 136 pages.

Parent et al., "Trace Inference, Curvature Consistency, and Curve Detection," IEEE Transactions on Pattern Analysis and Machine Intelligence, Aug. 1989, vol. 11, No. 8, pp. 823-839.

NantVision, "NantVision ViPR C SDK 5.0: Tutorial Guide," Jan. 22, 2015, 48 pages.

International Search Report and Written Opinion for International Application No. PCT/US2015/016068 dated Jun. 24, 2015, 20 pages.

Zhang, "Iterative Point Matching for Registration of Free-Form Curves and Surfaces," International Journal of Computer Vision, Oct. 1994, vol. 13, Issue 2, pp. 119-152.

Office Action issued in Chinese Patent Application No. 201580020031.6 dated Apr. 29, 2019, 10 pages.

Office Action issued in Chinese Application No. 201580020031.6 dated Nov. 20, 2018, 18 pages.

* cited by examiner

EDGE-BASED RECOGNITION, SYSTEMS AND METHODS

PRIORITY INFORMATION

This application is a continuation of pending application Ser. No. 15/488,371, filed Apr. 14, 2017, which is a continuation of application Ser. No. 14/623,341, filed on Feb. 16, 2015, and claims priority to U.S. Provisional Patent Application No. 61/940,325 filed Feb. 14, 2014, both of which are hereby incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The present invention relates to methods and systems for edge-based detection in image processing.

BACKGROUND

The following description includes information that may be useful in understanding the present invention. It is not an admission that any of the information provided herein is prior art or relevant to the presently claimed invention, or that any publication specifically or implicitly referenced is prior art.

There have been many recent advances in image processing techniques to recognize objects. One fairly old example includes the use of Scale Invariant Feature Transform (SIFT; U.S. Pat. No. 6,711,293 to Lowe titled "Method and Apparatus for Identifying Scale Invariant Features in an Image and Use of the Same for Locating an Object in an Image", filed Mar. 6, 2000). Objects can be identified within image data by using SIFT-based descriptors derived from the image data to lookup content information related to known objects where the content information has been indexed according to the descriptor space. Additional examples of recognizing objects include co-owned U.S. Pat. Nos. 7,016,532, 8,224,077, 8,224,078, and 8,218,873.

Such traditional image processing and object recognition techniques are quite suitable for recognizing well understood, specific objects (e.g., a person's face, a finger print, a bar code, etc.). However, they often fail when applied to generic objects lacking sufficient features for identification (e.g., a logo, a cup or mug, etc.). Furthermore, known methods of edge detection are not suitable for use in consumer grade products due to excessive computational resource requirements, especially when edges are used for object recognition, object classification, object tracking, or other type of object image data analysis. Further, the number of false positives generated by known techniques renders the techniques less than useable in markets where consumers have high expectations for accuracy. One approach that could aid in classifying objects represented in image data could leverage information relating to the apparent edges of objects.

Some effort has been directed to identifying edges and quantifying them use in identifying objects. One example includes the techniques described by Damen et al. titled "Real-Time Learning & Detection of 3D Textureless Objects: A Scalable Approach", 2012. Damen describes using a Line-Segment Detector and a Canny Edge Map to identify edgelets in image data. The edgelets are used to form constellations of edgelets, which can be used to search for related objects. Unfortunately, the Damen approach is unsuitable for use in resource-limited embedded systems (e.g., cell phones, etc.) because the time to identify edges and process edges is not suitable for frame rate video (e.g., greater than 20 fps) on an embedded device. Further, the Damen approach generates an inordinate number of false positives, which is unsuitable for use in a consumer market that demands high accuracy.

Some progress has been made toward analyzing image data to identify characteristics of object geometries as described by "A Computational Framework for Segmentation and Grouping" by Medioni et al. Copyright 2000, Elsevier Science B. V., ISBN 0 444 50353 6. Medioni describes using derived tensor fields from image data to identify geometric properties of objects represented by the image data. The geometric properties are then used to identify shapes within the image data where shapes can be considered to better conform to how a human would perceive the shapes. Although useful for identifying presence of shapes, Medioni fails to provide insight into how to resolve the issues related to high consumer demand. For example, the tensor algorithms used in the Medioni approach are quite computationally intensive.

Interestingly, the Medioni tensor-based approach provides a saliency measure that represents a perceived importance for geometrical structures. However the saliency measure is only used internally when determining the geometric structures. What has yet to be appreciated is that a saliency measure can be leveraged beyond mere identification of geometrical features. As described by the Applicant's work below, saliency, among other metrics, can also be used to provide an indication of which edges are perceived as being most important to work with, thus decreasing compute time and decreasing false positives.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved edge-based recognition systems capable of quickly reducing false positives.

SUMMARY OF THE INVENTION

The inventive subject matter provides apparatus, systems and methods in which one or more computing devices can operate as image processing systems to identify edges representing in image data and use the identified edges to recognizing objects or classify objects in a manner that reduces false positives.

One aspect of the inventive subject matter includes a method of enabling a device or a system to take an action based on image data. Disclosed method includes obtaining image data having a digital representation of an object of interest. An image recognition system, which is preferably executed by an image processing device (e.g., a tablet, smart phone, kiosk, augmented or virtual reality glasses, etc.) is programmed to perform such method. The method further comprises analyzing the image data to generate a collection of edges. For example, the method can include generating a collection of edges by executing an implementation of a co-circularity algorithm on at least a portion of the image data related to the object. In more embodiments, edges in the collection can include a perception measure (e.g., saliency, smoothness, length, etc.) indicating an "edged-ness" associated with the edge from a perception perspective.

From the collection of edges, the image recognition system can select a set of candidate edges based in part on the perception measure. These candidate set of edges represents possible starting points from which the image processing device can construct edge-based descriptors. Thus, the method can construct pixel level edgelets from the image data for the edges in the candidate set. The method then derives a plurality of edge-based descriptors from the edgelets where the descriptors represent constellations of edgelets. Once the constellations, or their corresponding descriptors, are identifying, they can be used to configure a device or the image recognition system to take an action based on one or more of the descriptors in the plurality of edge-based descriptors. For example, the action can include indexing content related to the object in a content database (e.g., database, file system, spill tree, k-d tree, etc.) according to the associated edge-based descriptors so that the content can be later retrieved. Another example action includes using the edge-based descriptors to query the content database for content related to the object.

Another aspect of the inventive subject matter includes a method of identifying content related to an object. Disclosed method includes obtaining image data, which is a representative of an object via a content identification engine. Then the image recognition system derives at least one edge-based descriptor from the image data. The method continue by generating a scale metric related to a portion of the image data, where the portion of the image data is determined based on the at least one edge-based descriptor.

Based on the derived edge-based descriptors, the method further continues to obtain a content candidate set from a content database storing content information indexed according to an edge-based descriptor space using the at least one edge-based descriptor. In a preferred embodiment, the content information includes scale information. Then, the image recognition system can further generate a content result set by filtering the content candidate set by at least comparing the scale information of content information in the result set to the scale metric. Once the content result set is generated, the image recognition system can enable a device to take an action based on the content result set Another aspect of the inventive subject matter includes a method of storing content related to an object. Disclosed methods include obtaining image data representative of an object via the image recognition system. Then the image recognition system derives at least one edge-based descriptor from the image data. Once the edge-based descriptor is derived, the image recognition system can generate a scale metric related to a portion of the image data.

It is preferred that the portion of the image data is determined based on the at least one edge-based descriptor. The method continues by storing content information related to the object in a content database using at least one edge-based descriptor. In the content database, content information is indexed according to an edge-based descriptor space. In a preferred embodiment, content information includes scale information related to the scale metric.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
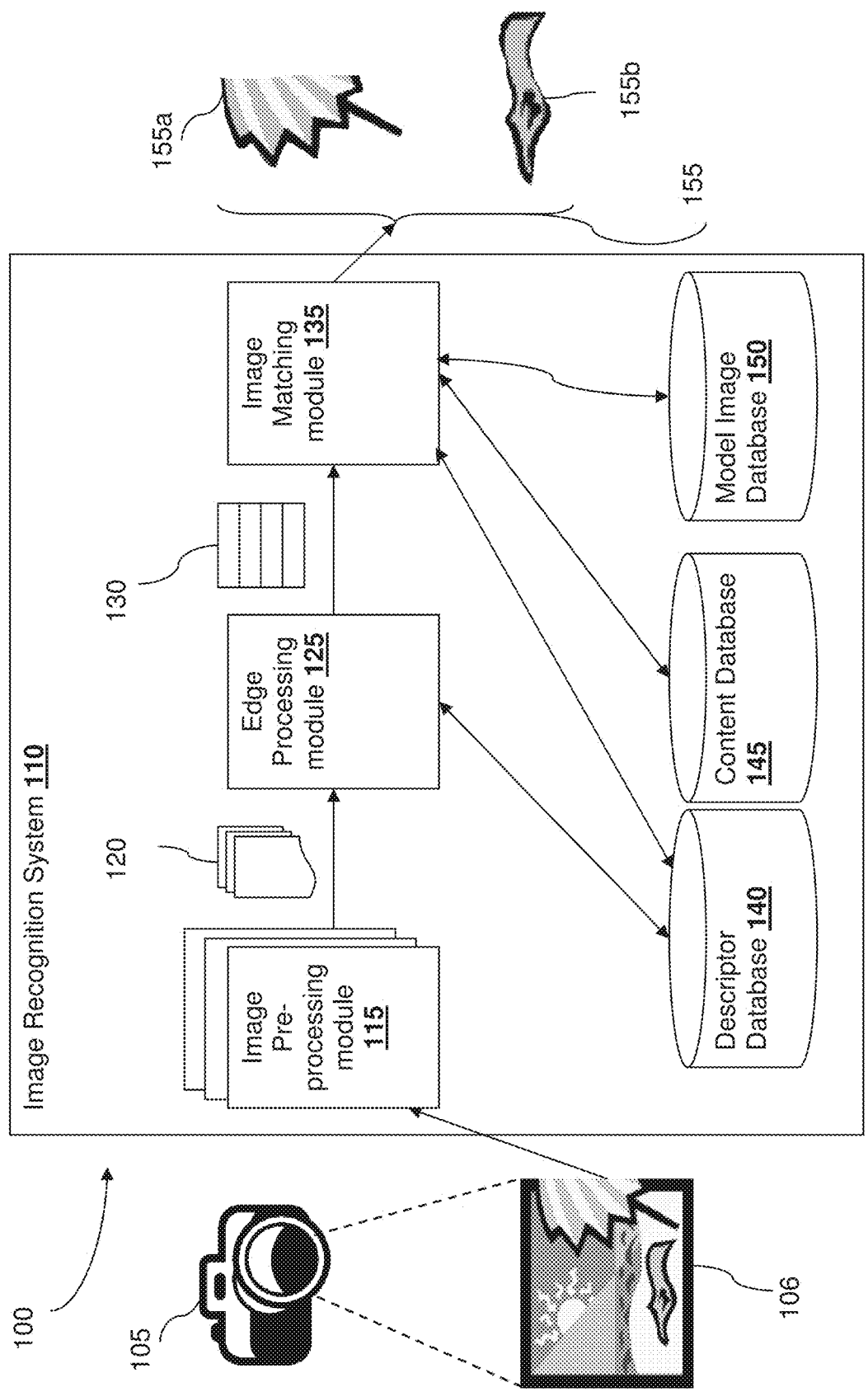
FIG. 1 illustrates an edge-based recognition ecosystem.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

One should appreciate that the disclosed object recognition system provides numerous advantageous technical effects. For example, the object recognition system of some embodiments enables accurate and efficient recognition of feature-less objects by analyzing the outline of the objects as they appear in the digital representation. Specifically, the object recognition system uses a novel and improved technique—co-circularity algorithm—to validate edges in the digital representation.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The focus of the disclosed inventive subject matter is to enable construction or configuration of a computing system to operate on vast quantities of digital data, beyond the capabilities of a human. Although the digital data represents a real-world object, it should be appreciated that the digital data is a representation of one or more digital models of the real-world object, not the real-world object itself. By instantiation of such digital models in the memory of the computing devices, the computing devices are able to manage the digital data or models in a manner that could provide utility to a user of the computing device that the user would lack without such a tool.

Glossary

The following terms are used throughout the remaining portion of the discussion. The meanings of these terms are presented for clarity and should not be construed as limiting the inventive subject matter.

An "edgel" represents a data structure object that includes location information (e.g., a x,y coordinate in image data, etc.), orientation information (e.g., a normal vector), and shape information (e.g., type of edge associated with edgel; curve, surface, etc.).

An "edge" represents a data structure object that defines a segment of a curve along pixels in an image where the curve comprises endpoints. A curve can comprise a chain of edgels.

An "edgelet" represents a data structure object that represents a short line segment centered on an edgel where the line segment has a direction (e.g., normal vector) and length. The length of the edgelet can be a single pixel, but could also have a length of multiple pixels, or multiple edgelets.

Edge Identification

Use of edge detection can aid in identifying generic objects that lack recognizable features (e.g., textures, patterns, color schemes, logos, words, barcode, QR-code etc.) by (1) generating one or more edge-based descriptors and (2) comparing such descriptors to known descriptors that are linked to object content or information. The following discussion related to edge identification leverages some known philosophical techniques as a foundation, and introduces new concepts to give rise to improved edge-based image processing capabilities. More specifically, the disclosed approach leverages a philosophical approach of tensor-based analysis of image data as described in "A Computational Framework for Segmentation and Grouping" by Medioni et al. Copyright 2000, Elsevier Science B. V., ISBN 0 444 50353 6; and edgelet constellation generation as described in Damen et al. titled "Real-Time Learning & Detection of 3D Textureless Objects: A Scalable Approach", 2012. The following disclosed approach departs from the disclosed tensor based discussion by focusing on co-circularity as described below, which results in one or more perceptional measures reflecting the perceptional quality of edges.

One should appreciate that the disclosed techniques are directed toward using edge-based descriptors to recognize objects in image data (e.g., still images, real-time image data, video images, video frames, etc.) while also reducing false positives. Two aspects of the inventive subject matter include ingestion of object data so that corresponding objects can be recognized as known objects and deriving edge-based descriptors from image data to recognize objects as known objects based on ingested object information.

FIG. 1 is a general schematic of an image data acquisition and recognition ecosystem 100. The ecosystem 100 comprises an image capturing device 105 and an image recognition system 110 coupled with the device 105. One should appreciate that the roles or responsibilities of the various inventive elements can be deployed or distributed across one or more suitably configured computing devices. For example, the device 105 could comprise the image recognition system 110. Alternatively, the device 105 could comprise one or more small applications that configure the device 105 to couple with the image recognition system 110 over a network (e.g., the Internet, cellular network, WAN, VPN, LAN, a personal area network, Wi-Fi Direct, DLNA, peer-to-peer, ad hoc, mesh, etc.).

The device 105 can include a cell phone, game console, a digital camera, appliances, a security camera, a mobile digital device, a kiosk, a GPS, medical imaging device, or a biometric device, which has an optical sensor to acquires image data (e.g., still image data, real-time image data, video image data, etc.) of an scene 106 depicting one or more objects (e.g., toys, clothing, cars, a tool, a tree, an animal, tissues, organs, a building, etc.). The device 105 can further include one or more other sensors (e.g., a global positioning system (GPS) sensor, a mechanical sensor, an accelerometer, a speed sensor, a proximity sensor, a vibration sensor, or other sensors), which can detect the movement or orientation of the optical sensor of the device 105.

The device 105 can also include one or more communication interfaces that enable the device 105 to exchange data with other computing devices. The communication interfaces can include wired or wireless interfaces and short range or long range interfaces. Wired interfaces can include interfaces such as Ethernet, USB, HDMI, RS-232, or even proprietary interfaces. Wireless interfaces can include interfaces such as WiGIG, wireless USB, UWB, Wi-Fi, cellular, Bluetooth®, Zigbee®, IrDA, or other wireless interfaces.

Image data of the scene 106 acquired by the device 105 is processed in the image recognition system 110 to extract edge-based descriptors of the object in the scene 106 and match the object with the a priori known candidate objects stored in content database 145 based on the edge-based descriptors of the object in the scene 106. The image recognition system 110 comprises one or more image pre-processing module 115, an edge processing module 125, an image matching module 135. In a preferred embodiment, the image recognition system 110 also comprises at least one of a descriptor database 140, a content database 145 and a model image database 150. However, it is also contemplated that at least one of a descriptor database 140, a content database 145 and a model image database 150 are third-party databases, and may be coupled with the image recognition system 110 over a network.

In a preferred embodiment, the image data of the object 106 is sequentially processed in the image recognition system 110. In this embodiment, the image data of the object 106 is pre-processed in the image pre-processing module 115 to generate post-processed image data 120. The post-processed image data 120 is then processed in the edge processing module 125 to generate edge-based descriptors 130 of the object in the image data 106. The generated edge-based descriptors 130 are stored in the descriptor database 140.

Based on the edge-based descriptors 130 of the object derived from the image data 106, a plurality of candidate objects with features corresponding to the edge-based descriptors 130 are selected from the content database 145. Among the plurality of candidate objects, false positive objects are removed via one or more filtering processes in the image matching module 135 to identify the one or more objects 155. In this example, the image recognition system 110 recognizes a picnic umbrella 155a and a blanket 155b from the digital data 106.

Figure 2:
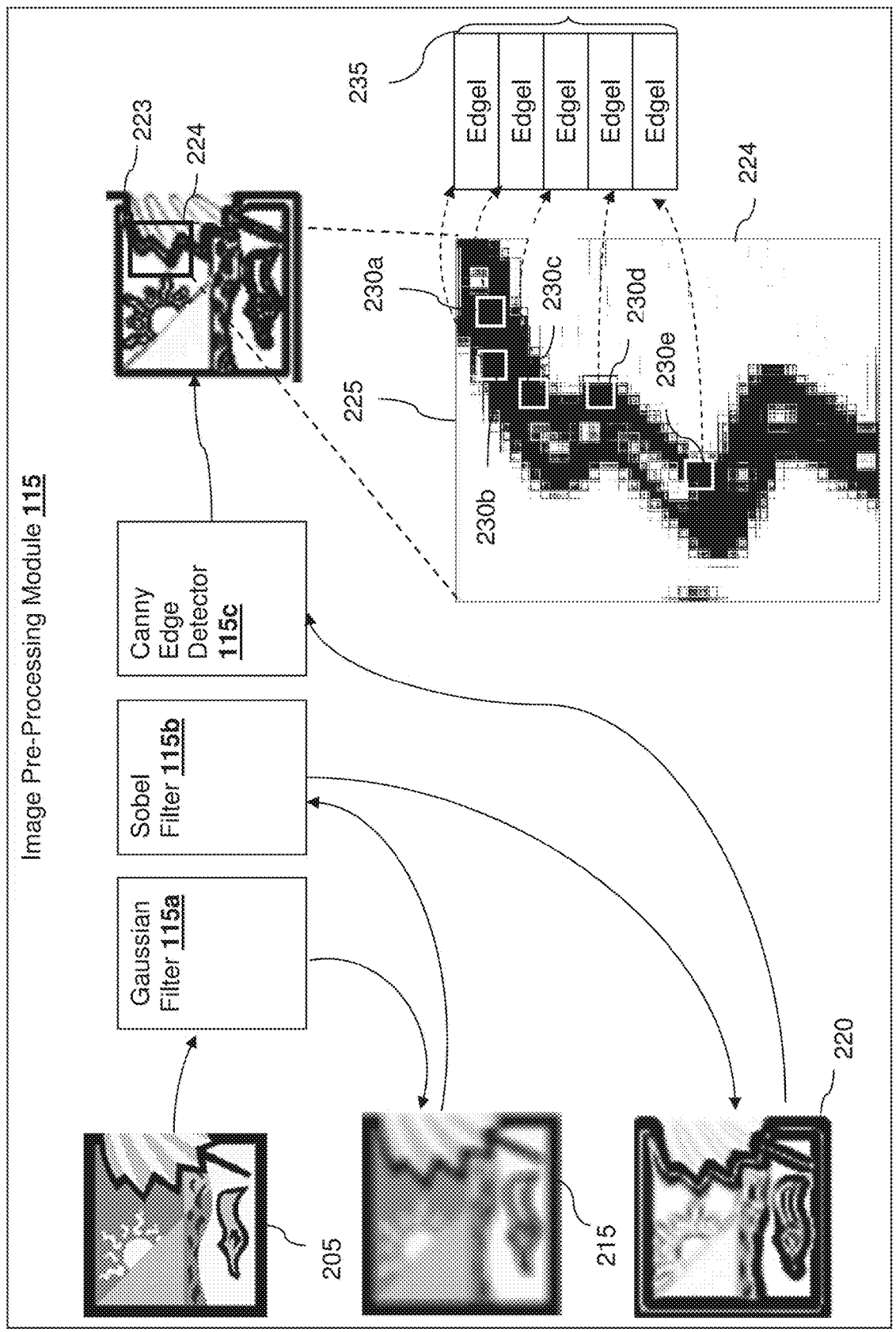
FIG. 2 illustrates details of an image pre-processing module of some embodiments.

FIG. 2 illustrates example processes that image pre-processing module 115 performs on image data. The processes or filters that are executed on the image data can enable the image recognition system 110 to more accurately and effectively derive edges and edge-related information from the image data. In this example, image pre-processing module 115 is programmed to execute an implementation of (a) a Gaussian filter 115a and (b) a Sobel filter 115b to image data 205. Although only Gaussian filter and Sobel filter are shown in this example, it is contemplated that other smoothening, blurring, or shading filters can be used by image pre-processing module 115. In this preferred embodiment, an implementation of the Gaussian filter 115a is first applied to the raw image data 205 to blur the image to create blurred image 215. Such blurring reduces image noise and reduces details in the raw image data 205. Thus, applying the Gaussian filter 115a to image data 205 has the effect of reducing the detection of weak or isolated edges.

The image pre-processing module 115 is programmed to perform the step of executing an implementation of the Sobel filter 115b to the blurred image 215. The Sobel filter 115b uses spatial gradient measurements on blurred image 215 to emphasize regions of high spatial frequency that correspond to edges. As shown, the resulting image 220 after applying the Sobel filter 115b has all of the potential edges accentuated.

As the strong edges become more apparent in the image, the image pre-processing module 115 of some embodiments is programmed to perform the step of detecting edgels on the edged-emphasized image 220. As mentioned above, an edgel is a data structure that represents a pixel on the image 220 that is detected to be part of an edge. Different embodiments of the image pre-processing module 115 uses different algorithms to detect edgels on the image 220. In some embodiments, the image pre-processing module 115 uses an edge detector 115c to perform an implementation of a Canny edge detection algorithm on the image 220 to generate edgels. Using an implementation of the Canny edge detection algorithm, the edge detector 115c thins out (or suppresses) the edges such that only the strong edges in the edge-emphasized image 220 are remained (i.e., the weak edges and edges that are not connected to strong edges are filtered out). For example, any edge pixel that does not have a strong edge pixel within its 8-connected neighborhood pixels are removed from the edgels.

As a result, a list of pixel-level edgels is detected. FIG. 2 illustrates edgels detected in a portion 224 of the image 220. In this example, the portion 224 of the image 220 includes a section of the umbrella 223. The image portion 224 is enlarged in the figure for illustrative purposes. As shown, the image portion 224 shows a clear outline of the umbrella 223. The edge detector 115c of some embodiments is programmed to perform the step of detecting edgels 235 from the pixels 230a, 230b, 230c, 230d, and 230e. It is contemplated that each edgel in the collection 235 corresponds to a pixel on the image 220. Preferably, each edgel 235 can be one pixel in length. However, it is contemplated that each edgel 235 comprises multiple pixels in length.

Figure 3:
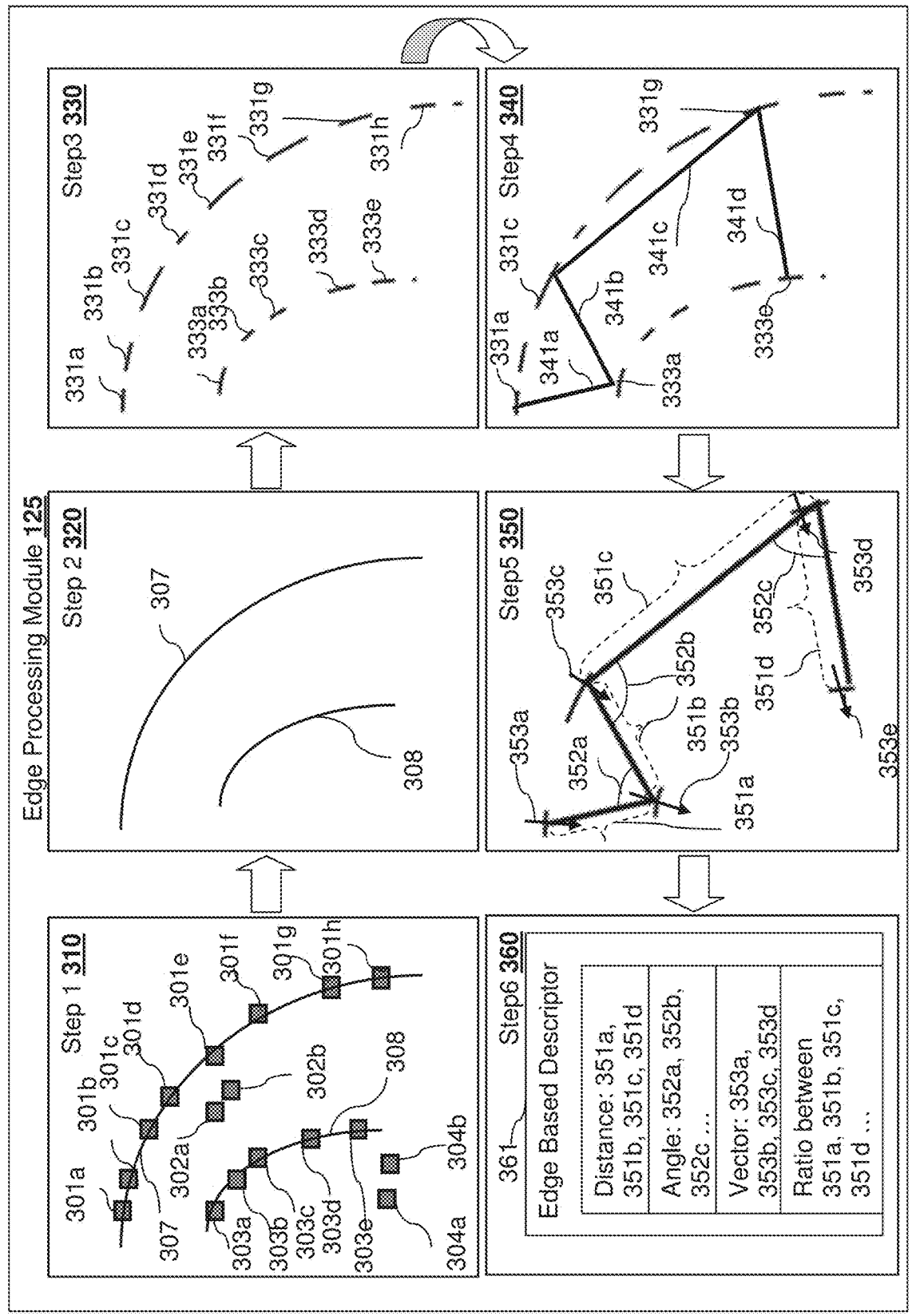
FIG. 3 illustrates details of an edge processing module of some embodiments.

Once the collection of edgels is detected, the image recognition system 110 is programmed to perform the step of using the edge processing module 125 to construct the edge-based descriptors based on the collection of edgels. FIG. 3 illustrates the process of constructing edge-based descriptors based on the collection of edgels through 6 steps—steps 310, 320, 330, 340, 350, and 360. In the first step 310, the edge processing module 125 executes an implementation of a co-circularity algorithm on the collection of edgels. The co-circularity algorithm leverages co-circularity of edgels to determine which edgels reside on the same edge, and generate one or more edges. Co-circularity seeks to determine if a curve (e.g., a circle, a portion of a circle etc.) having a radius could fit at least some of edgels. To determine the co-circularity, the edge processing module 125 computes a tensor field (e.g., a stick tensor, a ball tensor, etc.) for each edgel in the collection of edgels. The tensor field of an edgel represents the origin, size, and direction of the edgel. Once the edgels' tensor fields are computed, the edge processing module 125 uses the tensor fields as a co-circularity score to connect two neighborhood edgels. When two neighborhood edgels, for example edgel A and edgel B, are connected, the curve can be calculated as a function of the distance between two tensor field of edgel A and edgel B and an angle between the tangent of the osculating circle at edgel A and the line going through edgel A and edgel B.

One should appreciate that an edge that is almost a straight line could be considered a curve with a low curvature, or a circle having a very large radius, while an edge that is very curvy (having a sharp angle) could be considered a curve with a high curvature, or a circle having very small radius. Thus, the edge processing module 125 generates a collection of edges where each edge represents a curve. One should appreciate that co-circularity algorithm can be applied to the whole image or selected portions of the image, possibly related to an object of interest. Of specific interest, each edge can further include a perception measure that can be considered to indicate the "edged-ness" that a human might perceive the edge to have. Example perception measures include one or more of the length of the curve, a smoothness measure of the curve, a curvature of the curve, an intersection of curves, a conjunction of curves, or other measures indicating how a person might perceive the equality of the edge.

Thus, once a curve is determined, the edge processing module 125 can determine whether the curve can be considered a good edge by evaluating the number of edgels falling on the same curve. If multiple edgels also fall on the curve, to at least some quality measure (e.g., $\chi^2$ fit, a threshold, etc.), the curve is considered a good edge. In this example, there are seventeen edgels 301a-304b have been identified from an image. Using this collection of edgels, the edge processing module 125 identifies curves 307 and 308. Curve 307 appears to overlap with edgels 301a, 301b, 301c, 301d, 301e, 301f, 301g, 301h, and curve 308 appears to overlap with edgels 303a, 303b, 303c, 303d, 303e. Meanwhile, other curves can also be identified that overlap with smaller number of edgels. For example, edgels 302a and 302b can be on a third curve (not shown), and edgels 304a and 304b can be on a fourth curve (not shown). However, not all good edges are of equal quality or saliency. Therefore, in the second step 320, the edge processing module 125 of some embodiments selects a subset, possibly a proper subset, of edges from the collection of edges as candidate edges.

In some embodiments, the edge processing module 125 selects the candidate edges based on one or more criterion including the perception measure, length of edge or its associated curve, number of overlapped edgels, location in the image, depth information (e.g., see co-owned U.S. patent application publication 2012/0163672 to McKinnon titled "Depth Estimate Determination, Systems and Methods", filed Dec. 20, 2011), device location information (e.g., GPS, triangulation, RSS, etc.) or other available information. Of particular note, more preferred embodiments utilize the perception measures to determine which edges are of most interest as candidate edges. For example, all edges having lengths greater than 30 pixels and high smoothness could be considered candidate edges. In this example, the edge processing module 125 selects curves 307 and 308 as candidate edges because they exceeds the number of threshold overlapping edgels.

When the proper subset of candidate edges are selected, the edge processing module 125 can construct sets of edgelets, possibly at the pixel-level from among the candidate edges. The third step 330 provides an example of constructing a set of edgelets from the candidate edges 307 and 308 and the edgels 301a through 304b from steps 310 and 320. One should appreciate that each edgelet could correspond to a pixel-level edgel. However, an edgelet could represent more than one edgel, perhaps every two edgels, every three edgels, or other segmentation of the edges. For example, from the candidate edge 307, the edge processing module 125 constructs edgelets 331a, 331b, 331c, 331d, 331e, 331f, 331g, 331h that correspond to edgels 301a, 301b, 301c, 301d, 301e, 301f, 301g, 301h, respectively. Similarly, from the selected edge 308, the edge processing module 125 constructs edgelets 333a, 333b, 333c, 333d, 333e that correspond to edgels 303a, 303b, 303c, 303d, 303e, respectively. In some embodiments, each edgelet in the current implementation represents about 10 to 15 pixels. However, it is also contemplated that other pixel lengths (e.g., 1 pixel, 3 pixels, 5 pixels, 7 pixels, 20 pixels, 30 pixels, etc.) can be used to construct one edgelet.

Once the set of edgelets from the candidate edges are constructed, the edge processing module 125 is programmed to perform the step of constructing one or more constellation of edgelets in the fourth step 340. One should appreciate that a constellation of edgelets can be generated by adjusting tunable parameters such as angle of vectors, number of desired edgelets in the constellation, or other factors. In a preferred embodiment, the edge processing module 125 is programmed to perform the step of constructing, from the set of edgelets, constellations of five edgelets, with four rays, where the rays are projected respectively at angles 45, 90, 90, and 45 degrees from one edgelet to another. As shown in this example, the edge processing module 125 has constructed a constellation (as indicated by lines as rays connecting the edgelets) using five edgelets 331a, 333a, 331c, 331g, and 333e. The first ray 341a connects edgelets 331a and 333a. The second ray 341b connects edgelets 333a and 331c. The third ray 341c connects edgelets 331c and 331g, and the fourth ray 341d connects edgelets 331g and 333e.

In the fifth step 350, the edge processing module 125 is programmed to perform the step of deriving edge-based descriptors from the constellations of edgelets. In a preferred embodiment, the edge processing module 125 is programmed to perform the step of constructing an edge-based descriptor for each constellation of edgelets. Each edge-based descriptor is a data structure for storing attributes and characteristics of the corresponding constellation. In some embodiments, the edge processing module 125 can include invariant elements or dimensions (e.g., a length of a ray, an angle between two rays, a ratio between the length of projecting rays, a normal vector, etc.) in each edge-based descriptor. Thus, in the case of a constellation with five edgelets, an edge-based descriptor could comprise seven invariant elements or dimensions: three length invariant dimensions and four orientation invariant dimensions.

In a preferred embodiment, dimensions can be determined by ratios of the four projecting rays that project from one edgelet to another edgelet. For example, in the constellation of edgelets constructed in step 340, the edge processing module 125 can determine the length of four rays $d_1$ 351*a*, $d_2$ 351*b*, $d_3$ 351*c*, and $d_4$ 351*d*. Then the three length invariant dimensions could have values based on the ratios of ($d_2$ 351*b*/$d_1$ 351*a*), ($d_3$ 351*c*/$d_2$ 351*b*), and ($d_3$ 351*c*/$d_4$ 351*d*).

The edge processing module 125 of some embodiments is also programmed to perform the steps of determining the angles between the pairs of two rays, 352*a*, 352*b* and 352*c*, and including them as part of the edge-based descriptor. Furthermore, the edge processing module 125 can determine the orientation (e.g., normal vector, etc.) of the five edgelets in the constellation, $\hat{e}_1$ 353*a*, $\hat{e}_2$ 353*b*, $\hat{e}_3$ 353*c*, $\hat{e}_4$ 353*d*, and $\hat{e}_5$ 353*e*. Then, the orientation invariant dimensions of could have values based on a comparison of normal vectors of each edgelet in the constellation. For example, the values could be dot products of normal vectors of neighboring edgelets in the constellation such as ($\hat{e}_1$ 353*a*·$\hat{e}_2$ 353*b*), ($\hat{e}_2$ 353*b*·$\hat{e}_3$ 353*c*), ($\hat{e}_3$ 353*c*·$\hat{e}_4$ 353*d*), and ($\hat{e}_4$ 353*d*·$\hat{e}_5$ 353*e*).

Based on the length invariant dimensions and orientation invariant dimensions, the edge processing module 125 is programmed to perform the step of constructing an edge-based descriptor 361 in the sixth step 360. In a preferred embodiment, the edge based descriptor 361 comprises a vector with value of length invariant dimensions ($d_2$ 351*b*/$d_1$ 351*a*), ($d_3$ 351*c*/$d_2$ 351*b*), and ($d_3$ 351*c*/$d_4$ 351*d*) and orientation invariant dimensions (($\hat{e}_1$ 353*a*·$\hat{e}_2$ 353*b*), ($\hat{e}_2$ 353*b*·$\hat{e}_3$ 353*c*), ($\hat{e}_3$ 353*c*·$\hat{e}_4$ 353*d*), and ($\hat{e}_4$ 353*d*·$\hat{e}_5$ 353*e*)). In other embodiments, the edge based descriptor 361 may further comprise information of angles 352*a*, 352*b* and 352*c* between rays 341*a*, 341*b*, 341*c*, and 341*d* in the constellation. In some embodiments, the values can be normalized or scaled to an unsigned byte so that each member of the vector would have a value of 0 to 255 so that the descriptor would have a compact form.

In some embodiments, the edge based descriptor 361 further includes additional information beyond orientation invariant dimensions and length invariant dimensions of the constellation. For example, the edge based descriptor 361 can include a dimension that represents a gradient direction with respect to the edge(s) on the original image from which the corresponding constellation of edgelets was derived. A byte value of 0 could indicate that the object of interest as represented by edges has a dark colored interior and is surrounded by light colors, while a value of 255 could indicate that the object of interest has a light colored interior and is surround by dark colors.

Yet another possible piece of information that can be integrated into the edge-based descriptor 361 or treated separately as metadata includes scale information relating to the original ingested image data associated with the known object. Typically, such scale information is avoided as most image descriptors seek to be completely scale invariant. However, for generic objects, some relative scale information can be a strong discriminator of false positives during a recognition event. In this embodiment, the relative scale information relating to the dimensions of the constellations can be retained while also providing scale invariance.

Contemplated scale information can be generated as a scale metric related to the portion of the image data relating to the object of interest and based on the associated edge based descriptor 361. For example, the edge processing module 125 can generate a bounding box around the object of interest in the image where the bounding has a height (h) and width (w) measured in pixels. The bounding box could be generated based on the geometry of the constellation, other types of image descriptors (e.g., SIFT, BRISK, FREAK, etc.), or other parameters. One example of a scale metric can include a ratio of lengths related to the bounding box and the constellation of descriptors. Referring back to the description of the ray lengths above, the scale metric can be represented by $S=(d_1 \ \mathbf{351}a+d_2 \ \mathbf{351}b+d_3 \ \mathbf{351}c+d_4 \ \mathbf{351}d)/(h+w)$. This metric is a scale invariant with respect to capturing image data, but retains relative scale information associated with the object of interest. Once such scale metric information is available, the image processing device can reduce false positives generated by eliminating known edge-based descriptors that lack scale information that has similar values to the scale metric.

Figure 4:
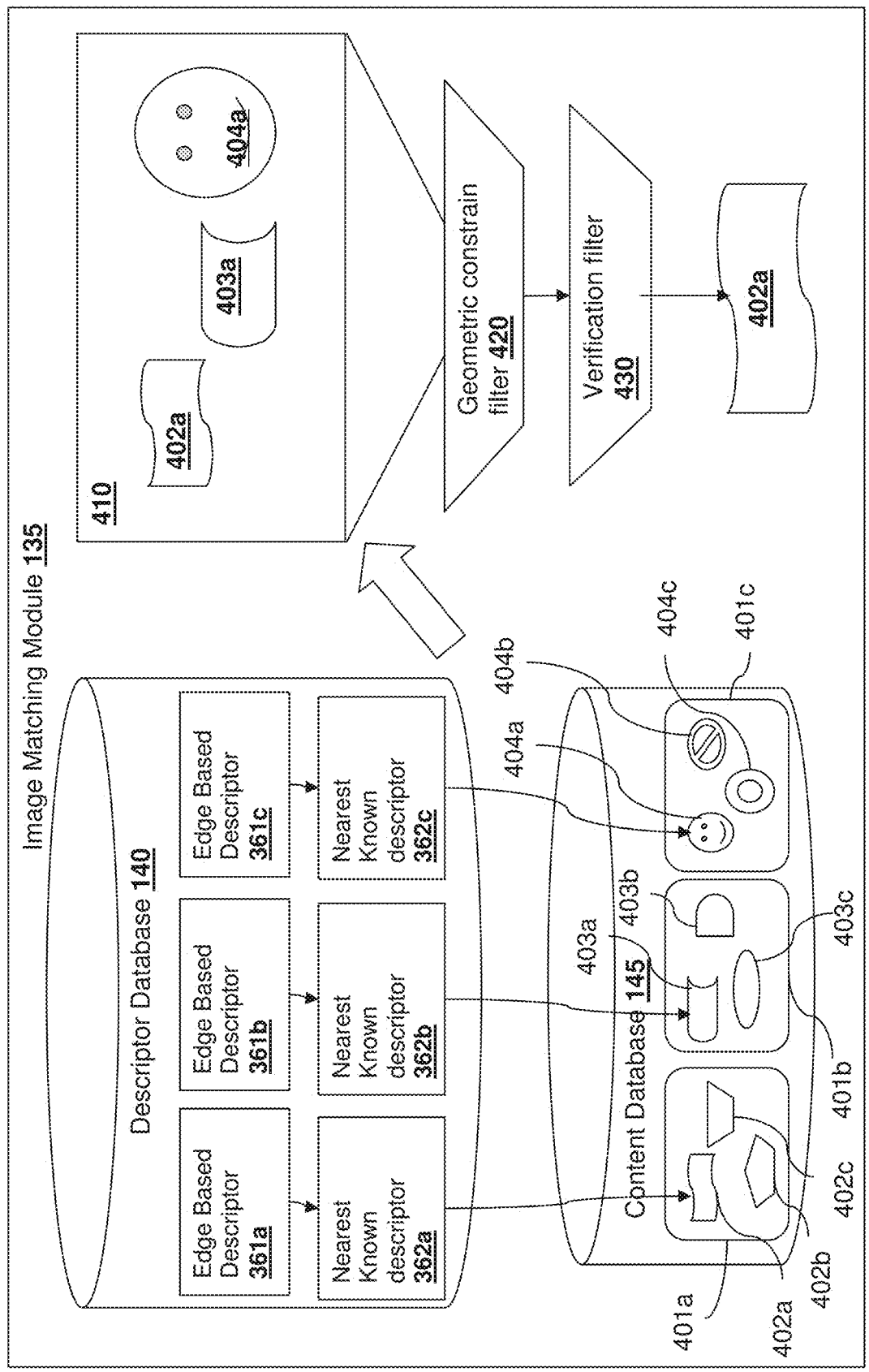
FIG. 4 illustrates details of an image matching module of some embodiments.

Once the edge-based descriptors are generated in the edge processing module 125, the image matching module 135 is programmed to perform the step of matching the derived edge-based descriptors with known objects. FIG. 4 illustrates the process of matching the derived edge-based descriptors with known objects in more detail. As mentioned, the image matching module 135 of some embodiments is programmed to perform the steps in this matching process. It is contemplated that the edge processing module 125 is programmed to perform the step of deriving more than one edge-based descriptor from the target object in the original image (e.g., possibly more than 5, more than 10, more than 100, more than 1,000 edge based descriptors). In this example, for the purposes of clarity and simplicity, the image matching module 135 obtains only three edge-based descriptors 361*a*, 361*b*, and 361*c* from the edge processing module 125. These descriptors 361*a*, 361*b*, and 361*c* may be derived by the edge processing module 125 from the same image data, or related image data.

In some embodiments, descriptor database 140 stores known descriptors (e.g., descriptors 362*a*, 362*b*, and 362*c*, etc.). These descriptors can be derived from training image data or image data that has been previously processed by the image recognition system 110. Each of these descriptors is associated with an object. As shown, descriptors 362*a*, 362*b*, and 362*c* are associated with objects 402*a*, 403*a*, and 404*a*, respectively. In preferred embodiments, the edge-based descriptors, 361*a*, 361*b*, and 361*c*, possibly along with other perception metrics or non-edge attributes (e.g., saliency measures, scale metrics, etc.) can also be used to construct or update the descriptor database 140. In some embodiments, the image matching module 135 comprises the descriptor database 140. It is also contemplated that that the image matching module 135 is communicatively coupled with the descriptor database 140 via network.

In one embodiment, the image matching module 135 further comprise the content database 145. The content database 145 comprises one or more content objects associated with their descriptors. In some embodiments, the content objects are grouped by one or more of their attributes (e.g., types, characteristics, ages, sizes, etc.). For example, content objects 402*a*, 402*b*, and 402*c* are grouped in a group 401*a*, based on their sizes. In another example, content objects 403*a*, 403*b*, and 403*c* are grouped in a group 401*b*, based on their geographic location. In yet another example, content objects 404a, 404b, and 404c are grouped in a group 401c, based on their overall shapes.

The image matching module 135 matches and indexes known edge-based descriptors in the descriptor database 140 with known target objects. In some embodiments, the descriptor database 140 can comprise a tree structure (e.g., a k-d tree, a spill tree, etc.) that organizes known edge-based descriptors according to the tree structure. Such an approach is advantageous in the field where test images fail to generate exact matches to the known edge-based descriptors. For example, a k-d tree can be used to match content objects where there are a vast number of content objects possibly matching with the edge-based descriptors. The k-d tree starts with a root (the first level) of the tree, where the data is split into two leaf nodes at a threshold value. The image matching module 135 makes a comparison between two split data based on the edge-based descriptor and other non-edge attributes (e.g., scale information, gradient information, other geometric information, etc.), and makes a determination to which first leaf node to descend. The data associated with the first leaf node becomes the first candidate of nearest neighbor of the edge-based descriptor. However, the first candidate of nearest neighbor may not be the true nearest neighbor of the edge-based descriptor. Thus, it is generally required further searches of a plurality of leaf nodes to find the true nearest neighbor, which is considered to be the best fit to the query. In some embodiments, the image matching module 135 may limit the number of nodes that can be searched per query. More detail of using k-d tree to match content objects can be found in the publication titled "Optimized KD-trees for fast image descriptor matching" by Silpa-Anan et al., published in 2008, which is incorporated herein in its entirety.

In other embodiments, the descriptor database 140 can utilize other types of matching protocol. For example, the descriptor database 140 can execute an implementation of a k-Nearest Neighbor (kNN) algorithm to match a known object based on the edge-based descriptor and other information (e.g., scale information, gradient information, other geometric information, etc.). The kNN algorithm is useful to match the candidate objects without prior or generalized learning process, because the classification by kNN algorithm is performed based on a majority vote of the nearest neighbors of each query point, instead of any prior assumptions. More detail of using kNN algorithm can be found in a publication titled "Manifold matching for High-Dimensional Pattern Recognition" by Seiji Hotta, published in 2008, which is incorporated herein in its entirety.

In this example, based on the input edge-based descriptor 361a, the image matching module 135 found descriptor 362a to be the nearest known descriptor within the descriptor database 140, which corresponds to content object 402a. Similarly, based on the input edge-based descriptor 361b, the image matching module 135 found descriptor 362b as the nearest known descriptor within the descriptor database 140, which corresponds to content object 403a. Again, based on the input edge-based descriptor 361c, the image matching module 135 found descriptor 362c to be the nearest known descriptor within the descriptor database 140, which corresponds to content object 404a. The objects that have been determined to be matching with the input edge-based descriptors are grouped as candidate object group 410.

In some embodiments, instead of selecting the objects that correspond to the nearest known descriptors, the objects in candidate object group 410 can be generated by randomly selecting objects within the groups 410a, 401b, and 401c, that match an affine hypothesis. For example, the image matching module 135 can apply random sample consensus (RANSAC) to arrive at that the candidate set.

The image matching module 135 is further programmed to perform the step of eliminating or filtering out objects within the candidate object group 410 that are deemed to be irrelevant or incorrect based on the image data (i.e., identifying false positives).

Under one approach, the image matching module 135 first removes outliers, via a geometric constrain filter 420, from the candidate object group 410. In some embodiments, each candidate object in the group 410 includes a set of geometric constrains (e.g., size, dimension, proportion among the dimensions, etc.). Thus, the image matching module 135 executes an implementation of the geometric constrain filter 420 to remove false positives by identifying alignment edges in the image data associated with the edge-based descriptors and determine if the edges in the image conform with the set of constrains associated with each of the candidate objects. If the alignment edges fail to fulfill most or all (e.g., 80%, 90%, etc.) of the constrains associated with a candidate object, such candidate object will be removed from the group 410 by the image matching module 135. Since most of the image data is two dimensional, the image matching module 135 of some embodiments uses homography geometry for two-dimensional objects and projection matrix for three-dimensional objects to make such a determination. In some embodiments, additional geometrical information of known objects can be linked with their descriptors and enables the image matching module 135 to find geometric constrain between query image and database image. Such an approach can include executing an implementation of an interactive closest point (ICP) algorithm. A suitable algorithm is disclosed by Besl et al. titled "A Method for Registration of 3-D Shapes" in IEEE Transactions on Pattern Analysis and Machine Intelligence, Vol. 14, No. 2, February 1992, which is incorporation herein in its entirety.

In some embodiments, false positives can be further reduced through other various techniques. As discussed previously, the perception metrics or scale metrics can be used to further filter the result set. In addition, the image matching module 135 can execute an implementation of one or more similarity filters to the edge-based descriptors and known descriptors to generate groups of paired descriptors where each group can be defined as satisfying one similarity geometric constrain. Each group could have multiple pairs and each pair would have one edge-based descriptor from the test image and a known edge-based descriptor from a training image. An example similarity filter can include a Hough transform.

Once the result set is obtained from the geometric constrain filter 420, the image matching module 135 is programmed to perform the steps of further reducing false positives and verifying the correct match out of the remained nearest neighbors through executing an implementation of a verification filter 430.

In some embodiments, the verification filter 430 uses convex hulls to verify the candidate objects. A convex hull is a bounding box that bounds the shape (e.g., the edges) of a target object defined by its edges from the image data or the candidate object. It can be used to eliminate false positives by comparing the convex hulls derived from the test image data to convex hulls of the candidate object (e.g., the modeled image of the candidate object). If the ratio of an area of the test images convex hull ($A_t$) to an area of the modeled image ($A_m$) is close to one, then there might be a good mach ($_{At}/_{Am}\leq 1$). Naturally, an affine transform might need to be applied to rectify the test image with the model image.

In a more interesting embodiment, the verification filter 430 also uses Normalized Coefficient Correlation (NCC) verification method to further eliminate false positives. The NCC verification ranks the candidate objects with their NCC ranking scores. The normalized correlation coefficient between model image and the test image would be utilized as the ranking score, which represents the global similarity between them. The higher NCC ranking score (generally ranged between 0 and 1) is, the more likely that the model image and the test image is matched. In some embodiment, the test image is a warped test image, which is transformed to the model image based on the transformation matrix derived by matcher and stored in the match list.

In some embodiments, with respect to using the descriptor database 140 for recognition purposes, the descriptor database 140 can be implanted as a web-based service (e.g., IaaS, SaaS, PaaS, etc.) using a k-d tree-based scheme where memory and processing resources are available. Further the descriptor database 140 can be implanted as an in-memory module, possibly based on spill trees, for use in low resource embedded devices (e.g., cell phone, smart phone, tablet, appliance, kiosk, etc.). Regardless of the form of the descriptor database 140, a consumer or other user can leverage the descriptor database 140 to recognize or classify generic objects based one edge-based descriptor derived from image data in real-time.

Figure 5:
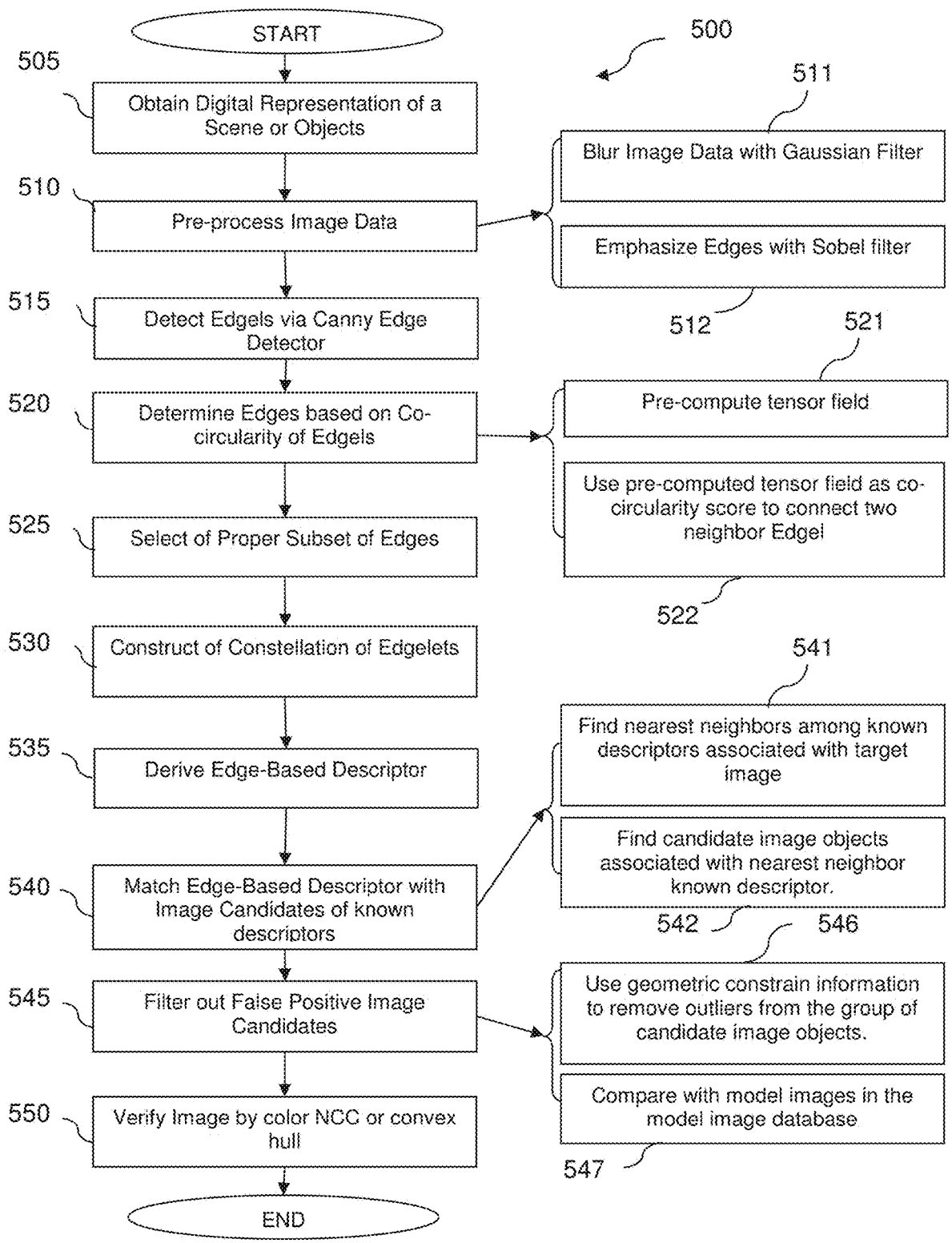
FIG. 5 illustrates a process for recognizing object in the edge-based recognition system of some embodiments.

FIG. 5 presents a process 500 for recognizing images based on edge-based descriptors. As represented in by step 505, the process begins with receiving digital representation of a scene or one or more objects (image data) by an imaging capturing device. Once the image data is obtained, the image data is processed in the image pre-processing module in step 510. Preferably, the image data is first blurred with Gaussian filter in step 511, and then the edges in the image data is emphasized with Sobel filter in step 512. The emphasized edges are further processed in Canny edge detector to detect a pixel level edgels in step 515.

Once the edgels are detected, edges can be determined by co-circularity of the edgels in step 520. In a preferred embodiments, the co-circularity of the edgels are determined by two steps: 1) tensor fields of edgels are pre-computed in step 521, and 2) connecting two neighbor edgels by using pre-computed tensor field as co-circularity score in step 522. The process of step 520 may generate many edges, which includes edges with high "edged-ness" and low "edged-ness". Thus in step 525, the method continues by selecting proper subset of edges, which has high "edged-ness" compared to other edges.

From the selected subset of edges, the process 500 continues by determining edgelets of the edges and constructing constellation of the edgelets in step 530 by placing one or more rays connecting between the edgelets. Once the constellation of edgelets is constructed, an edge-based descriptor can be derived from the constellation of edgelets in step 535. As described above, the edge-based descriptor may comprise at least one of length invariant dimensions and orientation invariant dimensions.

In the next step, step 540, the edge-based descriptor can be used to match with candidate images. First, the edge-based descriptor is compared with known descriptors with associated object images to find the nearest neighbors using a k-d tree, a spill tree, a kNN method or any other suitable classification methods in step 541. Once the nearest neighbor known descriptors are found, the objects associated with the nearest neighbor known descriptors are identified in step 542 and grouped as image candidates.

The final steps of image recognition based on edge-based descriptors are removing or reducing false positives from the group of image candidates in step 545 and verify the image objects in step 550. In step 545, false positive image candidates in the group of candidate images are filtered out. In this process, at least one of two methods can be used as described in step 546 and step 547. In step 546, outliers can be determined among the candidate objects by using geometric constrain information. In step 547, if the known descriptor is associated with a model image stored in the model image database, such model image can be compared to the candidate objects. Finally, in step 550, the method continues by verifying image by using convex hull to determine the overall shape of the object or color NCC to rank the filtered candidate images.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of enabling a device action based on image data, the method comprising:
    obtaining, by an image processing device, image data of a scene depicting an object wherein the image data is acquired by an optical sensor communicatively coupled to the image processing device;
    generating one or more edgels from the image data by executing one or more filters on the image data, the one or more edgels each comprising a data structure representing one or more pixels in the image data detected as part of an edge;
    building vectors based on at least a portion of the edgels and at least one perception measure for the edge, wherein at least the portion of the edgels are associated with the object;
    determining a correspondence between the edgels based on the vectors; and
    configuring a device to take an action based on the correspondence between the edgels, wherein configuring the device comprises storing or indexing content information associated with the object into a content database.

2. The method of claim 1, wherein the object comprises a tissue or an organ of an organism.

3. The method of claim 1, wherein the image processing device comprises one of a medical imaging device or a biometric device.

4. The method of claim 1, wherein the image data includes at least one of still image data, real-time image data, and video image data.

5. The method of claim 1, wherein the action comprises recognizing the object.

6. The method of claim 1, wherein the action includes indexing content information related to the object into a content database according to an indexing scheme based on an edge-based descriptor space.

7. The method of claim 6, wherein the indexing scheme comprises a tree structure.

8. The method of claim 7, wherein the tree structure comprises at least one of a spill tree and a k-d tree.

9. The method of claim 6, wherein the content information related to the object comprises non-edge attributes.

10. The method of claim 9, wherein the non-edge attributes comprise at least one of scale information, color information, and metadata.

11. The method of claim 1, further comprising generating a plurality of edge-based descriptors including at least one of color information and scale information based on the edgels.

12. The method of claim 11, further comprising providing access to a descriptor database storing known descriptors linked to content information related to the object.

13. The method of claim 12, further comprising updating the known descriptors associated with the object in the descriptor database based on one or more of the plurality of edge-based descriptors.

14. The method of claim 12, further comprising identifying pairs of nearest neighbor edge-based descriptors from the known descriptors and the plurality of edge-based descriptors.

15. The method of claim 14, further comprising grouping the pairs of nearest neighbor edge-based descriptors in groups of paired descriptors according to a similarity filter applied to the pairs of nearest neighbor edge-based descriptors.

16. The method of claim 15, wherein the similarity filter comprises a Hough transform.

17. The method of claim 15, further comprising generating a candidate set of matched descriptors from the groups of paired descriptors by randomly selecting descriptor pairs within each group of paired descriptors and identifying pairs that match an affine hypothesis.

18. The method of claim 17, further comprising generating a result set by reducing false positives from the candidate set of matched descriptors via identifying alignment edges in the image data associated with the plurality of edge-based descriptors to modeled image data associated with the known descriptors through a homography geometry.

19. The method of claim 17, further comprising generating the result set by reducing false positives from the candidate set of matched descriptors via filtering the candidate set based at least in part on at least one of scale information, color information, and one or more perception measures.

20. The method of claim 19, wherein the one or more perception measures comprise at least one of a length of a curve, a smoothness measure of a curve, a curvature of a curve, an intersection of curves, and a conjunction of curves.

21. The method of claim 1, further comprising determining, for at least a selected portion of the scene, which of the edgels reside on a same edge by determining if a curve having a radius could fit at least some of the edgels.

22. The method of claim 21, wherein the selected portion of the scene corresponds to a determined object of interest.

23. The method of claim 1, further comprising determining one or more of an origin, size, and direction of at least one of the edgels.

24. The method of claim 23, further comprising connecting two neighborhood edgels based on one or more of the origin, size, and direction of at least one of the edgels.

25. The method of claim 1, wherein an edgelet comprises one or more edgels.

26. An apparatus for enabling a device action based on image data, the apparatus comprising:
a processor;
a memory device storing software instructions for enabling a device action based on image data; and
an image processing device executable on the processor according to software instructions stored in the memory device and configured to:
obtain image data of a scene depicting an object wherein the image data is acquired by an optical sensor communicatively coupled to the image processing device;
generate one or more edgels from the image data by executing one or more filters on the image data, the one or more edgels each comprising a data structure representing one or more pixels in the image data detected as part of an edge;
build vectors based on at least a portion of the edgels and at least one perception measure for the edge, wherein at least the portion of the edgels are associated with the object;
determine a correspondence between the edgels based on the vectors; and
configure a device to take an action based on the correspondence between the edgels, wherein configuring the device comprises storing or indexing content information associated with the object into a content database.

27. A non-transitory computer-readable medium having computer instructions stored thereon for enabling a device action based on image data, which, when executed by a processor, cause the processor to perform one or more steps comprising:
obtaining image data of a scene depicting an object wherein the image data is acquired by an optical sensor communicatively coupled to the processor;
generating one or more edgels from the image data by executing one or more filters on the image data, the one or more edgels each comprising a data structure representing one or more pixels in the image data detected as part of an edge;
building vectors based on at least a portion of the edgels and at least one perception measure for the edge, wherein at least the portion of the edgels are associated with the object;
determining a correspondence between the edgels based on the vectors; and
configuring a device to take an action based on the correspondence between the edgels, wherein configuring the device comprises storing or indexing content information associated with the object into a content database.

* * * * *